(No Model.) 3 Sheets—Sheet 1.

J. CRUMP & R. BRERETON.
ROTARY QUARRIER AND STONE SHAPER.

No. 265,946. Patented Oct. 17, 1882.

Witnesses.
Inventors
John Crump
Richard Brereton (No Model.) 3 Sheets—Sheet 2.
J. CRUMP & R. BRERETON.
ROTARY QUARRIER AND STONE SHAPER.
No. 265,946. Patented Oct. 17, 1882.
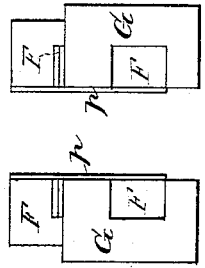
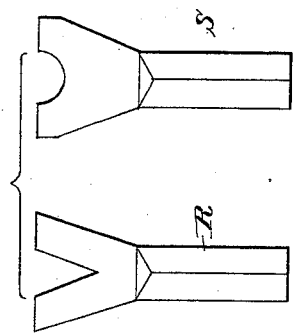
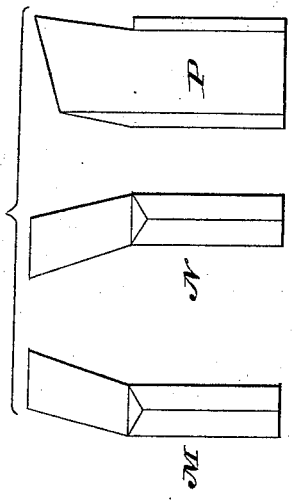
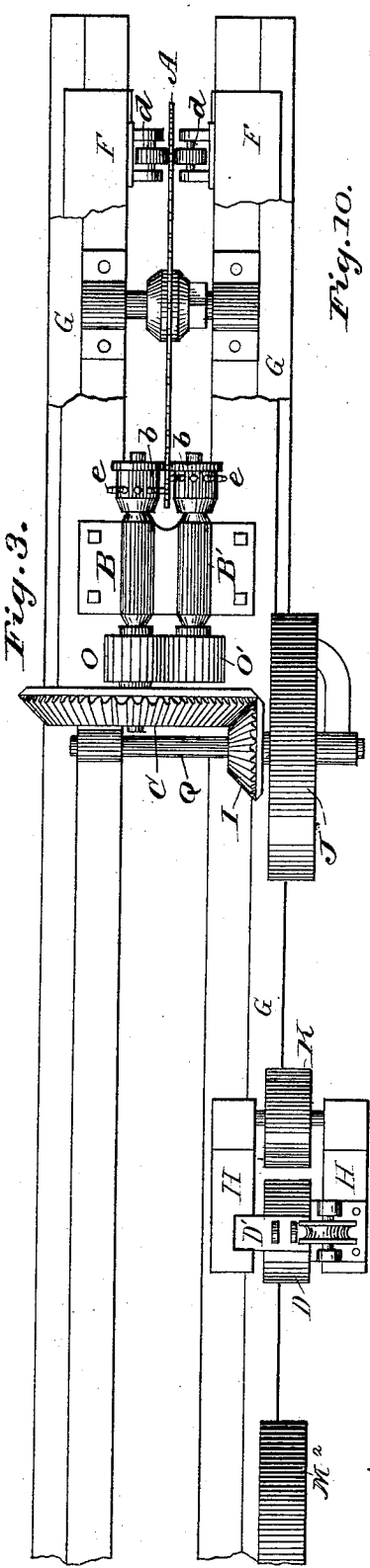
Witnesses.
Inventors (No Model.) 3 Sheets—Sheet 3.
J. CRUMP & R. BRERETON.
ROTARY QUARRIER AND STONE SHAPER.
No. 265,946. Patented Oct. 17, 1882.
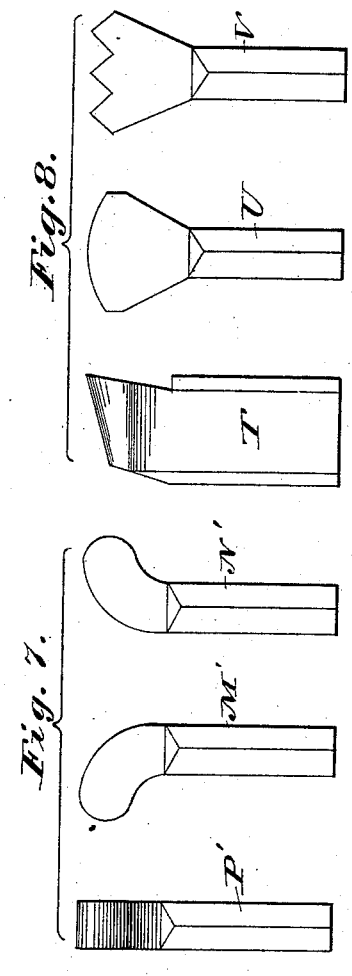
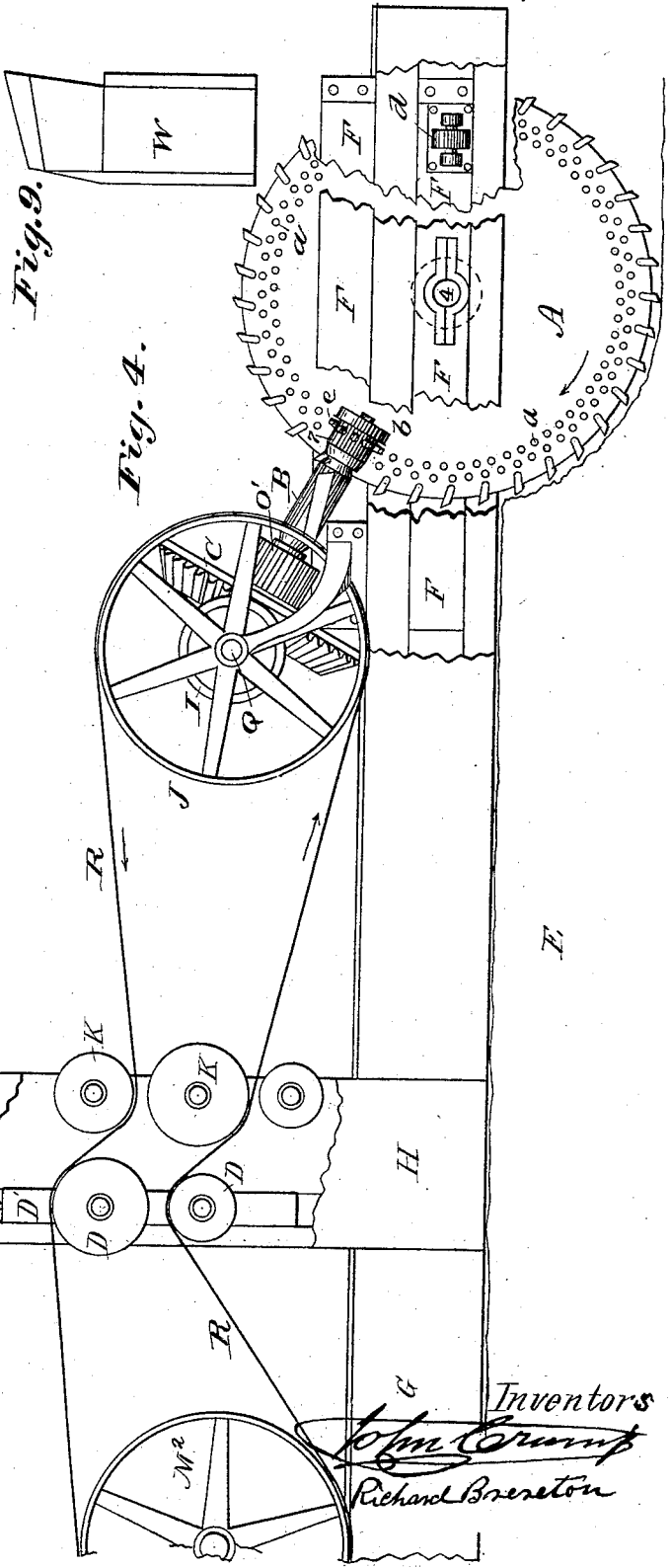

UNITED STATES PATENT OFFICE.

JOHN CRUMP AND RICHARD BRERETON, OF PHILADELPHIA, PA.

ROTARY QUARRIER AND STONE-SHAPER.

SPECIFICATION forming part of Letters Patent No. 265,946, dated October 17, 1882.

Application filed May 31, 1882. (No model.)

*To all whom it may concern:*

Be it known that we, JOHN CRUMP and RICHARD BRERETON, of Philadelphia, in the State of Pennsylvania, have invented a new and useful Machine for Cutting Stone, of which the following is a description, reference being had to the accompanying drawings, forming part of the same.

Our invention relates to machines for cutting stone from the bed in a quarry, but which may also be used to cut up large pieces of stone after removal from the quarry when desired; and the invention consists primarily in a novel cutting-wheel, and, second, in a novel method of operating the same, together with certain details hereinafter more fully set forth.

Figure 1:
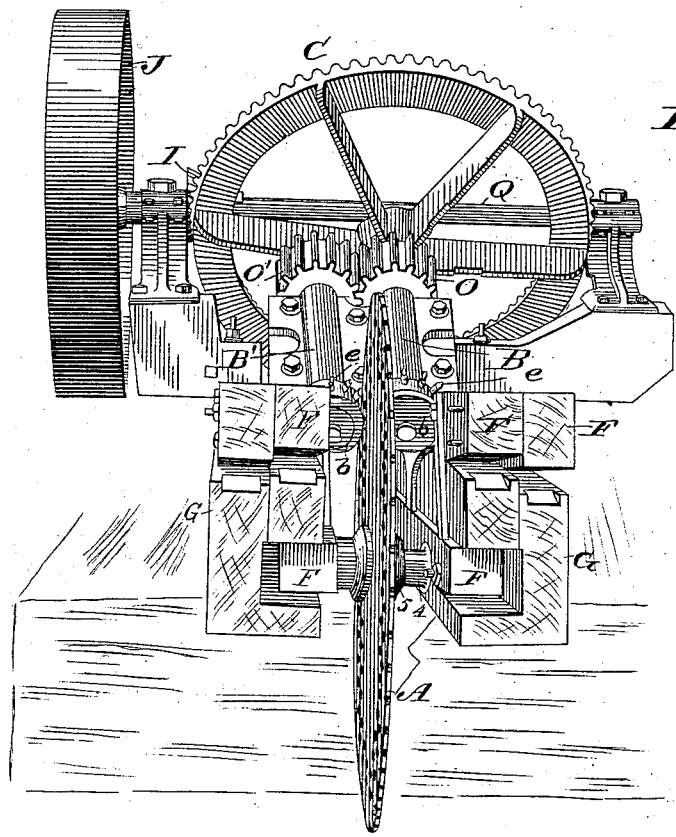
Figure 2:
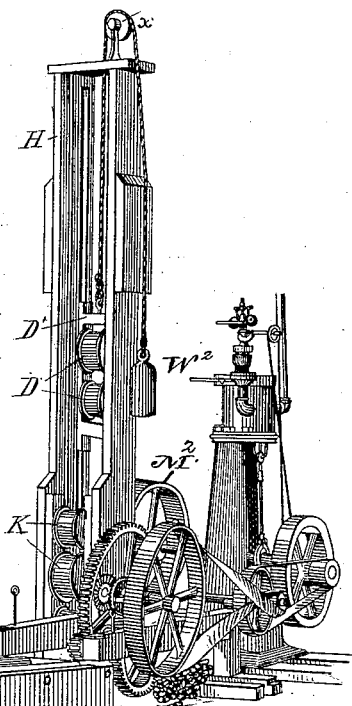

Figure 1 is an elevation of the cutting apparatus. Fig. 2 is a perspective view of the entire apparatus with an engine for driving the same. Fig. 3 is a top plan view, and Fig. 4 is a side elevation, of the machine. Figs. 5, 6, 7, 8, and 9 represent the various forms of cutting teeth or tools, shown detached; Fig. 10, an end view of the carriage and ways.

Various machines have been devised for the purpose of cutting blocks or masses of stone from the beds of quarries, the most prominent of which are what are known as "channeling-machines," in which a series of reciprocating drills are used to cut a channel or groove in the bed; but such machines are not adapted to cutting certain varieties of stone, for the reason that the drills are liable to fracture and injure the stone, especially if it be in thin layers. Various styles of machines have also been made in which saws were used to cut the stone; but as a general rule they have not been successful, the rapid motion of the saw and the friction of the teeth generating heat to such an extent as soon to destroy the temper of the teeth when made of metal, and the saws having diamond teeth or cutters are too expensive for general use.

The object of our invention therefore is to produce a machine that shall obviate these objections, and that can be successfully and economically used for the purpose of cutting stone from the bed of a quarry or to cut up large blocks or pieces of stone after removal from the quarry. In order to do this, we have devised a novel cutting device, which consists of a wheel, A, which may be made in the form of a disk, like a circular saw, only thicker; or it may be composed of a comparatively thin rim secured by arms to a hub, the form shown in the drawings being that of a disk. This disk or wheel is armed with a series of detachable cutters or teeth, the special forms of which will be more fully described hereinafter, they having their shanks formed with angles or ribs to fit correspondingly-shaped sockets or recesses made radially in the periphery of the disk or wheel, similar to the detachable teeth of circular saws, the main difference in this respect being that in this case the shanks of the teeth or cutters are made straight, the comparatively slow rotation of the wheel permitting this form to be used successfully, as there is no danger of their being thrown out by centrifugal force, as there is in circular saws, which necessarily run at a high velocity. These cutters we make of different forms for operating on different kinds of stone. For cutting slate and similar qualities of stone we use three forms of teeth, as represented in Fig. 5, there being one tooth, P, which has its cutting-point projecting in a line parallel with its shank, while the other two of the set, M and N, have their points projecting laterally, one to the right and the other to the left, so that when inserted their outer points will project laterally beyond the sides of the wheel, and thus cut a groove somewhat wider than the wheel. These may also be made with their cutting ends rounded instead of straight across, as shown in Fig. 7, in which P' represents the central cutter, and M' and N' the other two of the set.

For cutting marble, granite, and similar granular stones we use cutters having their cutting ends widened so as to project equally on each side, as represented in Fig. 8, in which T represents a cutter having its cutting-edge made in circular form, U one having its edge circular with flat sides, and V one having its edge provided with three V-shaped points, these three constituting another set intended to be used together.

In Fig. 9, W represents a cutter the cutting end of which is beveled to a central point, and which may be used instead of the cutter T of Fig. 8.

In Fig. 6 two other forms of cutters are shown, the cutting-edges of which are wider than their shanks, and having a V-shaped or a circular notch at the center, thus dividing the cutting-edge into two parts, and which may be used as substitutes for the cutters U and V of Fig. 8.

Having thus provided the cutting device or wheel A, the next step is to so operate it as to impart to the cutters a steady, strong, and comparatively slow movement, so that each cutter shall operate upon the stone on the principle of a plane-bit or of a graving-tool, and thus plane or cut out a section of the stone as they move, and at the same time have the movement so slow as to prevent the generation of such a degree of heat as would affect their temper. To accomplish these results, instead of driving the cutter-wheel A by means of the shaft on which it is mounted, we drive it by power applied near its periphery in the following manner: The wheel itself, as shown in Figs. 1, 2, and 4, is provided with two or more rows of holes or perforations, $a$, as near its edge as is practicable without weakening it at the points where the cutters are inserted. We then provide two parallel shafts, B and B', which are provided at or near their front ends with a series of radial pins or studs, $e$, arranged to correspond with and engage in the holes $a$, as shown clearly in Figs. 3 and 4, the pins $a$ on one shaft engaging in the holes of one row and those of the other shaft engaging in the holes of the other row. Upon the extreme ends of the shafts we form collars $b$, which bear against the sides of the wheel A to act as guides and hold it steady, so as to prevent any buckling or trembling of the wheel. Instead of rigid collars, loose rollers may be used, if preferred. On the opposite side of the wheel A we also mount a pair of guide-rollers, $d$, as shown in Fig. 3, for the same purpose.

As shown in Figs. 1, 2, 3, and 4, the cutter-wheel, with its operating mechanism, is mounted on a short movable frame or carriage, F, which is itself mounted on a couple of timber ways, G G, in such a manner as to slide back and forth thereon, the ways G G being laid flat on the face of the quarry-bed or stone to be cut, as represented in Fig. 2.

The two shafts B and B', as shown, are arranged parallel with each other on opposite sides of the cutter-wheel A, and are provided with pinions O and O', which gear into each other, so as to cause the shafts B and B' to rotate in perfect unison, thereby causing each of the shafts to exert an equal force on the cutter-wheel, the effect being to draw or lift that edge of the wheel gradually and steadily upward with great power. Upon the rear end of one of these shafts, B, is rigidly secured a beveled-gear wheel, C, which engages with a smaller bevel-wheel, I, secured on a transverse shaft, Q, mounted in suitable bearings on the frame F, and having on it a band-wheel or pulley, J, as shown, and by which motion is imparted to the cutter-wheel through the intermediate gearing by means of a belt, R, driven by a steam-engine or any suitable motor located in rear of the ways G, as indicated in Figs. 2 and 4.

The movable frame or carriage F, as shown in Figs. 2 and 3, consists of two upper and two lower timbers or parts, the two on each side being connected by vertical plates or bars $p$, as shown in Figs. 1 and 10, it being so arranged that while the upper timbers rest upon the upper surface of the ways G G the lower ones rest in grooves made on the inner faces of the ways G, thereby insuring a true and steady movement of the carriage on its ways.

Motion may be imparted to the carriage by any suitable means, an endless chain attached to the carriage and passing around a wheel at the front end of the ways, (not shown in the drawings,) and from thence back to a chain-wheel at the motor, working well for this purpose.

Instead of a chain feed, a rack and pinion or a screw feed may be used; it only being necessary to so arrange the operating-gear as to impart to the carriage the proper movement to advance the cutter-wheel at the required rate. We prefer, however, to use the chain feed, and to operate the chain-wheel by a worm-wheel, as being the most suitable and efficient means for the purpose, as it enables us to apply a steady and strong pull to the carriage without danger of delay from breakage, &c.

The cutter-wheel is arranged to rotate in such a direction as always to cause the cutting to be effected by the cutters moving from below upward instead of from above downward, as is ordinarily the case with circular saws. This we do for two reasons: first, because it draws the ways down and holds them firmly upon the face of the bed, thereby dispensing with any fastenings for that purpose; and, second, because we have ascertained by experiment that the cutting is effected more rapidly, as the cutters, as they come up, bring with them and remove from the channel or groove all the chips, so that each successive cutter has an uninterrupted opportunity to take a firm hold on the uncut stone. We have also discovered that the stone is cut more easily and with less power by having the cutters operate diagonally upward, as all stone has a grain or natural line of cleavage, and by arranging the cutters to operate in the manner described the resistance against division of the stone is less than when the force is applied in any other direction. The cutter may be arranged to cut either to or from the edge of the bed, as may be desired.

It is also obvious that two or more pairs of shafts B and B' may be used to operate the cutter-wheel A by arranging them at suitable points and properly connecting them with gearing, thereby reducing the strain and wear on the pins $e$ of each pair.

As the cutter is driven by a belt or other flexible connection from the engine, that is stationary while the carriage, with the cutter, is moving, means must be provided for taking up the slack of the belt, and to do this we provide a vertical frame, H, which is located directly in front of the driving-wheel $M^2$ of the engine, as shown in Figs. 2 and 3. In the lower portion of this frame we secure two fixed pulleys, K K, and in a sliding frame, D', which is held suspended by a counter-weight, $W^2$, as shown, we mount two other pulleys, D D. The belt R passes from the drive-wheel $M^2$ over the lower pulley D in the sliding frame D', thence under the lower pulley K, around the pulley J of the carriage, thence back under the upper pulley K, and over the upper pulley D back to the drive-wheel $M^2$, as shown in Fig. 4. The counter-weight $W^2$ is to be sufficiently heavy to keep the required tension on the belt. When thus arranged it will be seen that as the carriage is drawn back the weight $W^2$ will draw up the frame D', and will thus take up the slack of the belt as fast as it is produced by the movement of the carriage, and that as the carriage is run out again to commence a new cut the movable pulleys D will be drawn down by the straightening out of the belt, and in this way we are enabled to operate the cutter.

A very important feature of our invention is the comparatively slow movement of the cutters, so that they shall not become heated to such an extent as to affect the temper of the steel cutters, which we are thus enabled to use without water being applied during the operation to keep them cool, as is ordinarily done in stone-sawing machines of all kinds.

The speed or rate of movement of the cutters must vary somewhat with different qualities of stone, and to enable others to more readily and successfully use our invention we give the following rates of speed, which by a series of experiments we have found to be proper for cutting different kinds or qualities of stone, viz: for cutting slate across the grain, a velocity of from twenty-four to twenty-six feet; cutting with the grain, from twenty-eight to thirty-two feet per minute; for cutting granite, from eighteen to twenty feet; brown-stone and similar grit sandstones, from twenty to twenty-four feet per minute. While these are the velocities which in experience we have found to give the best results, it will of course be understood that they may be varied more or less, according to circumstances of the case, as it often happens that stone of a given variety in one bed or quarry may be either harder or softer than the same variety in another bed or locality By means of our invention we find in actual practice that stone can be cut with rapidity and without injury, and that steel cutters can be successfully used for that purpose without the application of water and without destroying or seriously impairing their temper.

It is obvious that, if desired, a small steam-engine may be mounted on the carriage and connected direct to the driving-gear of the cutting-wheel, it being supplied with steam from a stationary boiler by a flexible hose, as is done with stone-channeling machines, or that it may be operated by compressed air, as may be preferred, in which cases the device for taking up the slack of the belt and the belt itself may be dispensed with.

Having thus fully described our invention, what we claim is—

1. The cutter wheel or disk A, provided with the detachable cutters and perforations $a$, in combination with the driving-shafts B B', each provided with the studs or pins $e$, arranged to engage in said perforations, substantially as shown and described.

2. In combination with the disk or wheel A, provided with detachable cutters and perforations $a$, the shafts B B', provided with the studs or pins $e$, and the pinions O and O', all arranged to operate substantially as and for the purpose set forth.

3. The combination of the disk or wheel A, provided with the perforations $a$, and mounted on a shaft rotating in fixed bearings, with the driving-shafts B B', provided with the studs or pins $e$ and the collars or rollers $b\ b$, all arranged for joint operation as set forth.

4. In combination with the ways G G, the carriage F F, having mounted thereon the cutter-wheel A, provided with the perforations $a$, and the driving-shafts B B', provided with the pins or studs $e$, said shafts being arranged to engage with the cutter-wheel on opposite sides and parallel with each other, with suitable gearing for operating the same, substantially as shown and described.

5. In a stone-cutting apparatus substantially such as described, the combination of the reciprocating carriage having the cutter-wheel A, with its operating mechanism mounted thereon, and arranged to be driven by a belt or similar flexible connection, the stationary motor, and the intermediate stationary frame H, provided with fixed pulleys K K, and the sliding pulleys D D, having the counter-weight W attached, all arranged to operate as set forth.

Philadelphia, April 17, 1882.

JOHN CRUMP.  [L. S.]
  RICHARD BRERETON.  [L. S.]

Witnesses:
  ORMOND RAMBO,
  H. AVERY, Jr.